(12) United States Patent
Satam

(10) Patent No.: US 11,345,237 B2
(45) Date of Patent: May 31, 2022

(54) DRIVE MODE SELECTOR FOR A DRIVETRAIN, VEHICLE COMPRISING SUCH A DRIVE MODE SELECTOR, AND A METHOD OF SELECTING A DRIVE MODE OF A DRIVE TRAIN

(71) Applicant: JAGUAR LAND ROVER LIMITED, Coventry (GB)

(72) Inventor: Parag Satam, Warwickshire (GB)

(73) Assignee: Jaguar Land Rover Limited, Coventry (GB)

( * ) Notice: Subject to any disclaimer, the term of this patent is extended or adjusted under 35 U.S.C. 154(b) by 378 days.

(21) Appl. No.: 16/477,690

(22) PCT Filed: Dec. 18, 2017

(86) PCT No.: PCT/EP2017/083243
§ 371 (c)(1),
(2) Date: Jul. 12, 2019

(87) PCT Pub. No.: WO2018/130378
PCT Pub. Date: Jul. 19, 2018

(65) Prior Publication Data
US 2019/0359060 A1   Nov. 28, 2019

(30) Foreign Application Priority Data

Jan. 13, 2017 (GB) ..................................... 1700611

(51) Int. Cl.
*B60K 35/00* (2006.01)
*B60K 20/08* (2006.01)
*B60K 37/06* (2006.01)
*B60W 10/10* (2012.01)
*B60W 50/08* (2020.01)
(Continued)

(52) U.S. Cl.
CPC .............. *B60K 35/00* (2013.01); *B60K 20/08* (2013.01); *B60K 37/06* (2013.01); *B60W 10/10* (2013.01);
(Continued)

(58) Field of Classification Search
CPC ........ B60K 35/00; B60K 20/08; B60K 37/06; B60K 2370/143; B60K 2370/782;
(Continued)

(56) References Cited

U.S. PATENT DOCUMENTS

2012/0283894 A1    11/2012  Naboulsi
2014/0081521 A1*   3/2014   Frojdh ............... G01C 21/3664
                                                         701/36
(Continued)

FOREIGN PATENT DOCUMENTS

DE   102007042650 A1   3/2009
DE   102009031649 A1   1/2011
(Continued)

OTHER PUBLICATIONS

Search and Examination Report, GB1700611.5, dated Jul. 11, 2017.
International Search Report and Written Opinion, PCT/EP2017/083243, dated Apr. 20, 2018.

*Primary Examiner* — Ibrahim A Khan
(74) *Attorney, Agent, or Firm* — McCoy Russell LLP

(57) ABSTRACT

A drive mode selector for a drivetrain of a vehicle, a vehicle comprising such a drive mode selector, and a method of selecting a drive mode of a drivetrain. The drive mode selector comprises a controller for receiving a selection signal from a gesture sensor, the selection signal being indicative of a drivetrain drive mode associated with an identified selection gesture made by a user. The controller is also for receiving a status signal indicating a status of at least one vehicle component. The controller is configured to cause the drivetrain to enter the drive mode indicated by the selection signal when the status signal indicates that the drive mode can be selected.

18 Claims, 11 Drawing Sheets

(51) Int. Cl.
- *F16H 59/08* (2006.01)
- *F16H 63/42* (2006.01)
- *G06F 3/01* (2006.01)
- *G06F 3/0488* (2022.01)

(52) U.S. Cl.
CPC ........... B60W 50/082 (2013.01); F16H 59/08 (2013.01); F16H 63/42 (2013.01); G06F 3/017 (2013.01); G06F 3/0488 (2013.01); *B60K 2370/143* (2019.05); *B60K 2370/146* (2019.05); *B60K 2370/1442* (2019.05); *B60K 2370/782* (2019.05)

(58) Field of Classification Search
CPC ...... B60K 2370/146; B60K 2370/1442; B60K 20/02; B60W 10/10; B60W 50/082; F16H 59/08; F16H 63/42; G06F 3/017; G06F 3/0488

See application file for complete search history.

(56) References Cited

U.S. PATENT DOCUMENTS

| | | | | |
|---|---|---|---|---|
| 2014/0149909 A1* | 5/2014 | Montes | ............... | B60K 20/08 715/771 |
| 2014/0167944 A1* | 6/2014 | Yamaguchi | ..... | B60W 30/18018 340/439 |
| 2014/0277896 A1* | 9/2014 | Lathrop | .................. | B62D 1/06 701/23 |
| 2014/0309806 A1* | 10/2014 | Ricci | ...................... | G06F 21/32 701/1 |
| 2015/0094899 A1* | 4/2015 | Hackenberg | ........ | B60W 50/082 701/23 |
| 2015/0123947 A1* | 5/2015 | Jubner | .................. | B60K 37/06 345/175 |
| 2015/0253858 A1* | 9/2015 | Koukoumidis | ......... | A63F 13/21 345/156 |
| 2016/0090104 A1* | 3/2016 | Diaz-Jimenez | ....... | B60W 50/10 701/70 |
| 2017/0102774 A1* | 4/2017 | Naruse | .................... | G06F 3/017 |
| 2017/0120930 A1* | 5/2017 | Ling | ...................... | G06F 3/017 |

FOREIGN PATENT DOCUMENTS

| | | |
|---|---|---|
| DE | 102013219511 A1 | 4/2015 |
| DE | 102014009355 A1 | 12/2015 |
| JP | 2003139229 A | 5/2003 |
| JP | 2006177401 A | 7/2006 |
| WO | 2014085277 A1 | 6/2014 |

\* cited by examiner

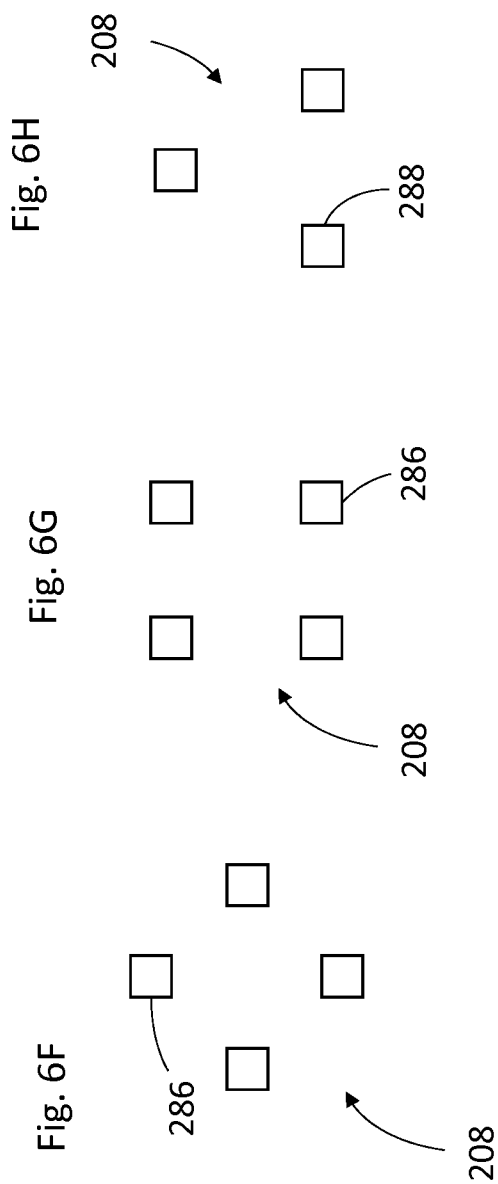

DRIVE MODE SELECTOR FOR A DRIVETRAIN, VEHICLE COMPRISING SUCH A DRIVE MODE SELECTOR, AND A METHOD OF SELECTING A DRIVE MODE OF A DRIVE TRAIN

CROSS-REFERENCE TO RELATED APPLICATIONS

This application is a 371 of International Application No. PCT/EP2017/083243, filed Dec. 18, 2017, which claims priority to GB Patent Application 1700611.5, filed Jan. 13, 2017, the contents of both of which are incorporated by reference herein in their entirety.

TECHNICAL FIELD

The present disclosure relates to a drive mode selector for a vehicle. The invention has been developed for use with a drivetrain comprising an automatic or semi-automatic transmission, and will be described with reference to this specific implementation. It will be appreciated, however, that the invention has application in other embodiments, such as in electric and hybrid cars.

Aspects and embodiments of the invention relate to a drive mode selector for a drivetrain of a vehicle, a vehicle comprising such a drivetrain, and a method of selecting a drive mode of a drivetrain of a vehicle.

BACKGROUND

Automatic transmissions are one conventional way of transferring torque from an internal combustion engine to a differential that supplies power to drive wheels of a vehicle such as a car. Referring to FIG. 1, which shows a front-engined rear wheel drive car 100, an internal combustion engine in the form of engine 102 is coupled to an automatic transmission 104 via a torque convertor (not shown). The output of the torque convertor is stepped down by the automatic transmission 104 and drives a drive shaft 106, which in turn drives a differential 108. The differential 108 in turn drives a left wheel 110 and a right wheel 112 at the rear of the car 100.

The automatic transmission 104 has a number of drive modes, including a park mode, a reverse mode, a neutral mode and a forward ("drive") mode. In the park mode, the automatic transmission is disengaged from the torque convertor, and internally locked to prevent the car 100 from moving (if on a hill for example). In the reverse mode, the left wheel 110 and right wheel 112 drive the car 100 rearwardly when the park brake and foot brake (not shown) are disengaged and the accelerator (not shown) depressed. In the neutral mode, the automatic transmission is disengaged from the torque convertor but, unlike in the park mode, is not internally locked. This allows the car 100 to roll as long as the park brake and foot brake are disengaged. In the forward mode, the left wheel 110 and right wheel 112 drive the car 100 forwards when the park brake and foot brake are disengaged and the accelerator depressed.

Selection of the drive mode of the automatic transmission 104 conventionally involves moving a lever 114 between positions representing each of the various modes. A typical sequence (from forward/top to rear/bottom) is park, reverse, neutral, forward ("drive").

Typically, the lever 114 is positioned at the forward end of a central console that extends between the front seats of a car. The lever 114 is often relatively bulky to allow it to easily be found and manipulated by a driver's hand without the driver having to look at it. The bulk of the lever and associated hardware adds significant costs and weight to the vehicle, and its position can be inconvenient, taking up useful space between the front seats and dashboard.

SUMMARY OF THE INVENTION

Aspects and embodiments of the invention relate to a drive mode selector for a drivetrain of a vehicle, a vehicle comprising such a drivetrain, and a method of selecting a drive mode of a drivetrain of a vehicle, as claimed in the appended claims.

According to an aspect of the invention, there is provided a drive mode selector for a drivetrain of a vehicle, the drive mode selector comprising:

a controller for receiving:
  a selection signal from a gesture sensor, the selection signal being indicative of a drivetrain drive mode associated with an identified selection gesture made by a user; and
  a status signal indicating a status of at least one vehicle component;
the controller being configured to cause the drivetrain to enter the drive mode indicated by the selection signal when the status signal indicates that the drive mode can be selected.

The controller may include an output for controlling the gesture sensor, such that the gesture sensor only identifies the selection gesture when enabled to do so by the controller.

The controller may include an output for controlling the gesture sensor, such that the gesture sensor only outputs the selection signal when enabled to do so by the controller.

The status signal comprises an indication of whether a brake is engaged, wherein the controller is configured such that it can only cause the drivetrain to enter the drive mode indicated by the selection signal when the status signal indicates that the brake is engaged. The brake may take the form of brake operated by the user via a foot pedal, known as a foot brake, or alternatively may be operated by the user via a lever adapted to be pulled by a user's hand.

The status signal may comprise an indication that a steering control, such as a steering wheel, handlebars, or other means provided for the driver to steer the vehicle, is being grasped or touched by a user, wherein the controller is configured such that it can only cause the drivetrain to enter the drive mode indicated by the selection signal when the status signal indicates that the steering control is being grasped or touched by the user.

The status signal may comprise an indication that the steering control is being grasped or touched on a side of the steering control opposite from where the gesture sensor is installed in the vehicle.

The status signal may comprise an indication that the steering control is being grasped or touched on two positions of the steering control prior to the gesture being made by the user.

The status signal may comprise an indication of vehicle speed, or an indication that the vehicle's speed is above or below a threshold, and the controller may be configured such that it can only cause the drivetrain to enter the drive mode indicated by the selection signal when the status signal indicates that the vehicle's speed is lower than a or the threshold.

The drivetrain may comprise an automatic or semi-automatic transmission, the at least one forward drive mode and at least one reverse drive mode being modes of the transmission.

The drivetrain may have a plurality of forward drive modes, and the controller may be configured to:

receive an increment signal from the gesture sensor, the increment signal being indicative of a drive mode increment gesture made by the user, and in response thereto, to cause the drivetrain to enter a higher forward drive mode than the current forward drive mode; and receive a decrement signal from the gesture sensor, the decrement signal being indicative of a drive mode decrement gesture made by the user, and in response thereto, to cause the drivetrain to enter a lower forward drive mode than the current forward drive mode.

The drive mode selector may comprise the gesture sensor, and the gesture sensor may be configured to:

identify the selection gesture made by a user; and output the selection signal associated with the identified selection gesture.

The gesture sensor may comprise one or more proximity sensors.

According to a further aspect of the invention, there is provided a vehicle that comprises a drive mode selector according to the first aspect. In an example, the brake is configured to be controlled by the driver by means of a foot pedal or hand lever. Additionally or alternatively, the steering control comprises a steering wheel or handlebars.

According to an additional aspect of the invention, there is provided a method of selecting a drive mode of a drivetrain of a vehicle, the drivetrain having at least one forward drive mode and at least one reverse drive mode, the method comprising:

receiving:

a selection signal from a gesture sensor, the selection signal being indicative of a drive mode associated with an identified selection gesture made by a user; and a status signal indicating a status of at least one vehicle component, the status of the or each vehicle component being relevant to at least one of the drive modes; and causing the drivetrain to enter the drive mode indicated by the selection signal when the status signal indicates that the drive mode can be selected.

The additional aspect may comprise any of the steps and/or functionality of the drive mode selector aspect, as well as any of the steps and/or functionality described in the following detailed description.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described, by way of example only, with reference to the accompanying drawings, in which:

FIGS. 6A to 6H show schematic views of alternative gesture sensors for use with embodiments of the invention;

DETAILED DESCRIPTION

Figure 1:
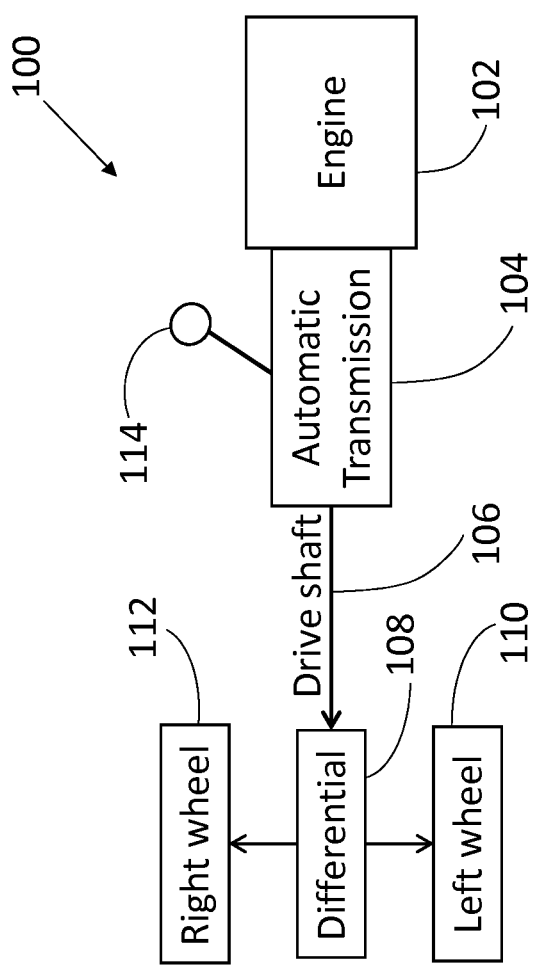
FIG. 1 is a schematic showing drivetrain components of a vehicle.
Figure 2:
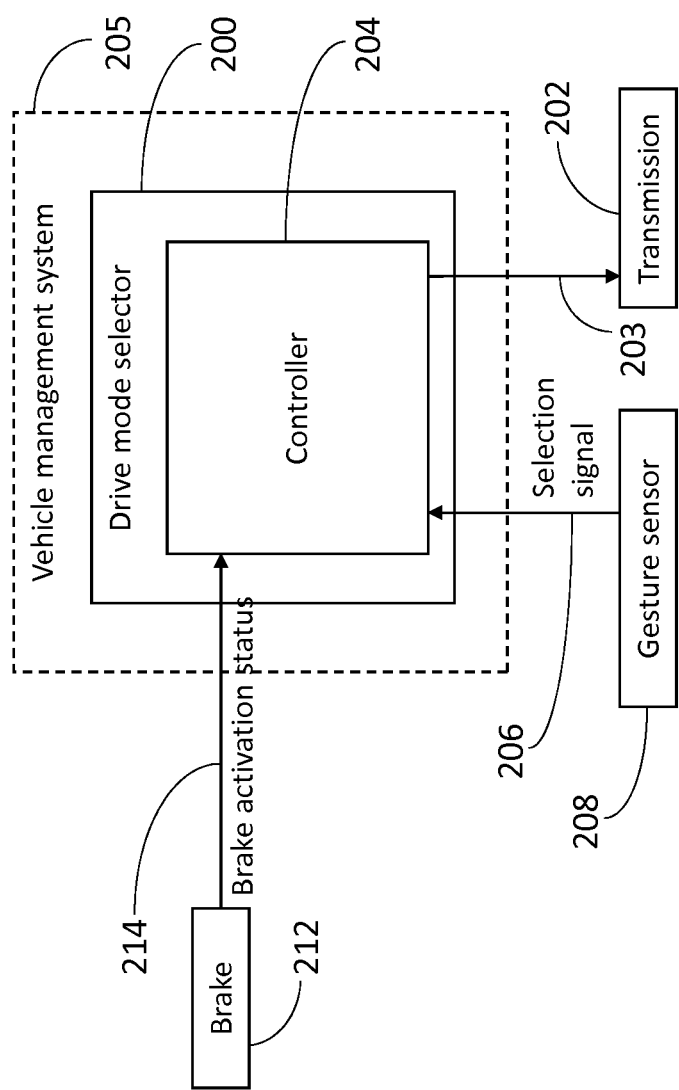
FIG. 2 is a schematic diagram showing components of a vehicle, comprising a drive mode selector according to an embodiment of the invention.

Referring to FIG. 2, there is shown a drive mode selector 200 for a drivetrain of a vehicle. In the embodiment of FIG. 2, the drivetrain comprises an automatic transmission 202 similar to that described in relation to FIG. 1. The automatic transmission (and hence the drivetrain) has a forward drive mode equivalent to the forward mode described in relation to FIG. 1, and a reverse drive mode equivalent to the reverse mode described in relation to FIG. 1.

The drive mode selector 200 comprises a controller 204. The controller 204 may be a separate computer, such as a microprocessor, or may be a software module running on a computer, such as a microprocessor, that is responsible for one or more other tasks within the vehicle. The controller 204 may form part of an electronic vehicle management system 205 that includes and/or communicates with other processors, sensors and outputs, as known to the skilled person.

The controller 204 is configured to receive a selection signal 206 from a gesture sensor 208. The selection signal 206 may be transmitted directly from the gesture sensor 208, or may be supplied to the controller 204 by the vehicle management system 205. In either case, the selection 206 signal may be transmitted over a wired connection, such as a direct connection, a network connection or a bus. Alternatively, the selection signal may be transmitted wirelessly, such as by way of Bluetooth® or an IEEE 802.11-based protocol, for receipt by the controller 204. The selection signal 206 is indicative of a drive mode associated with an identified selection gesture made by user (i.e., a driver), as described in more detail below.

In the embodiment of FIG. 2, the gesture sensor 208 takes the form of an electric field proximity sensor. Such sensor function by detecting small changes in an electromagnetic field generated between antenna electrodes.

In alternative embodiments, a different sensor or sensors can be employed. For example, the gesture sensor may include any one of more of the following proximity sensor types:
  Capacitive
  Capacitive displacement
  Doppler effect
  Eddy-current
  Inductive
  Laser rangefinder
  Magnetic
  Passive optical (such as charge-coupled devices)
  Passive thermal infrared
  Photocell (reflective)
  Radar
  Reflection of ionising radiation
  Sonar (active or passive)
  Ultrasonic
  Fiber optic
  Hall effect Alternatively, or in addition, the gesture sensor may include one or more sensors that identify a gesture without specifically measuring proximity. For example, a camera mounted in a position above and/or to the front of the area where the gesture is to be made may capture images that are analysed to determine a gesture. Such a camera need not determine proximity per se.

The above examples of sensor(s) that may be used in the gesture sensor is not intended to be exhaustive.

Whatever form it takes, the gesture sensor 208 may be exposed within the interior of the vehicle, or may be concealed beneath internal finishing surfaces. Whether the gesture sensor 208 is exposed or concealed may be a function of aesthetics, cost, or functionality. For example, some types of gesture sensor, such as an optical or ultrasonic-based sensor, may not work well or at all if covered with an unsuitable material.

The controller 204 is also configured to receive a status signal indicating a status of at least one vehicle component. The status of the or each vehicle component may be relevant to at least one of the drive modes, either individually or taken together. In the embodiment of FIG. 2, the vehicle component is a vehicle brake, such as a foot brake 212, and the status signal is a foot brake status 214 that indicates whether the foot brake 212 is being pressed by a driver's foot. Whilst this example focusses on the application of the drive mode selector 200 in a car, it will be appreciated that is may be configured for use in other types of vehicles, for example a motorcycle, where the steering control takes the form of handlebars and the brake may be a foot or hand operated brake. As such, other forms of vehicle brake, such as vehicle brake arranged to be operated by the user via hand controls, are also useful. The foot brake status 214 may be transmitted directly from the foot brake 212, for example by using a switch. Alternatively, the foot brake status 214 may be supplied to the controller 204 by the vehicle management system 205. In either case, the foot brake status 214 may be transmitted over a wired connection, such a direct connection, a network connection or a bus. Alternatively, the foot brake status 214 may be transmitted wirelessly, such as by way of Bluetooth® or an IEEE 802.11-based protocol, for receipt by the controller 204. In this embodiment, the foot brake status 214 is relevant to selection of both the forward drive mode and the reverse drive mode for the reasons described below.

The controller 204 is configured to control the drive mode of the transmission 202. In the present example, that means that the controller 204 may be used to place the transmission 202 in either the forward drive mode or the reverse drive mode. A control signal 203 that enables the placing of the transmission 202 into these drive modes may be output directly to the transmission 202 by using switching, or may rely on a communication protocol. Alternatively, the control signal 203 may be supplied from the controller 204 to the vehicle management system 205, which in turn controls the transmission drive mode. In either case, the control signal 203 may be transmitted over a wired connection, such as a direct connection, a network connection or a bus. Alternatively, the control signal 203 may be transmitted wirelessly, such as by way of Bluetooth® or an IEEE 802.11-based protocol, for receipt by the transmission 202 or the vehicle management system 205.

The skilled person will appreciate that, in other embodiments, the controller 204 may be configured to place the transmission 202 in other drive modes, such as park mode, neutral mode, and/or into specific gears. Alternatively, or in addition, the transmission 202 may be placed into such other drive modes in response to other signalling. For example, park mode may automatically be entered responsive to a park brake being applied when the car is stationary.

Figure 3:
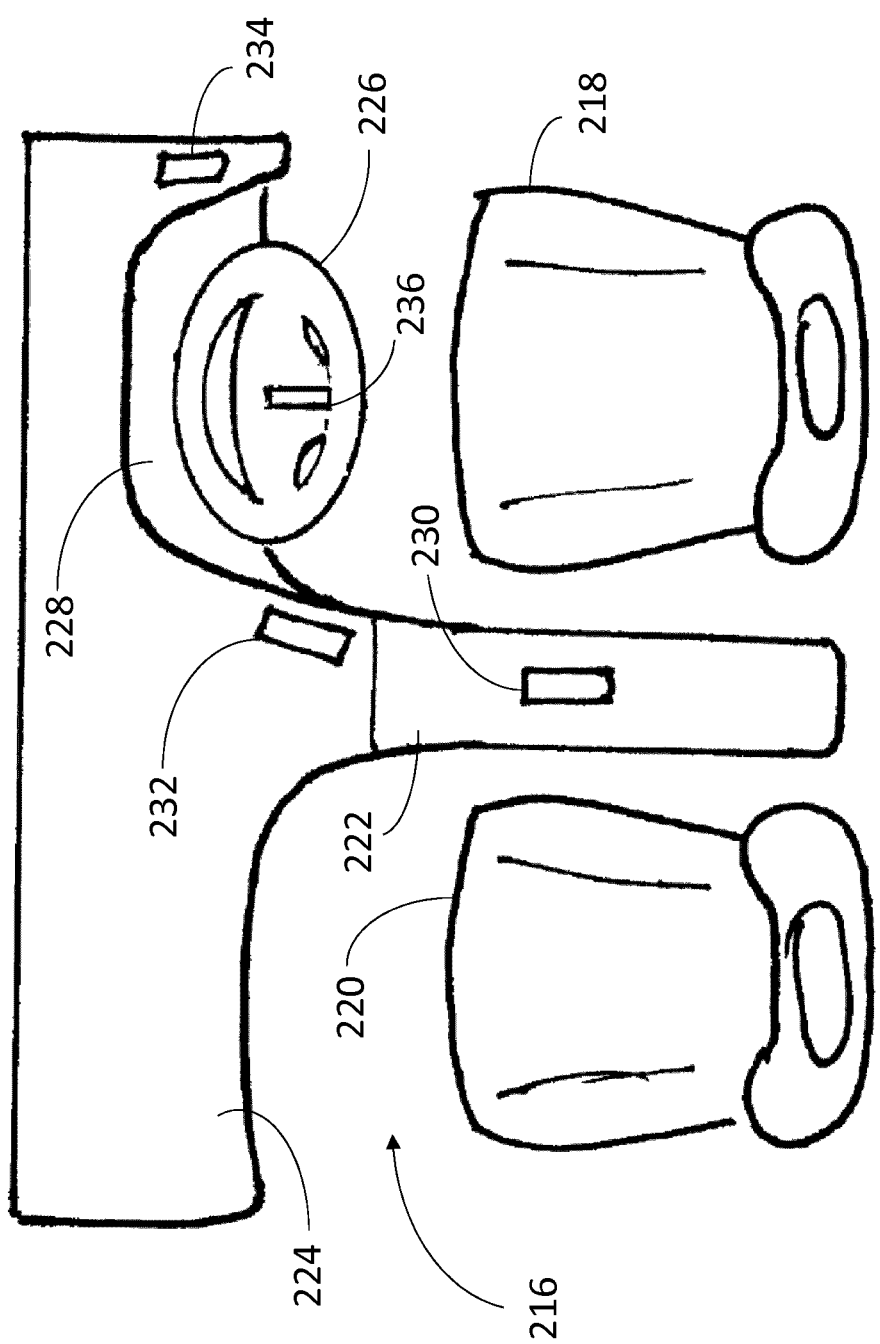
FIG. 3 is a plan view of a vehicle interior showing example locations of a gesture sensor, for use with a drive mode selector according to an embodiment of the invention.

Turning to FIG. 3, there is shown a car interior 216 including a driver's seat 218 and a passenger seat 220. A console 222 extends between the seats 218 and 220, sweeping up to meet a dashboard 224. A steering control in the form of a steering wheel 226 is positioned between the driver's seat 218 and an instrument panel 228 positioned beneath and partly covered by the dashboard 224. Several potential positions for the gesture sensor 208 are shown in FIG. 3. Typically, only a single gesture sensor 208 location is provided, but more than one position may be provided to allow the driver to choose whichever option feels more comfortable or natural to use, for example. A first position 230 for the gesture sensor 208 is in the console 222 between the seats 218 and 220. A second position 232 for the gesture sensor 208 is centrally on the dashboard 224, above where it meets the console 222. A third position 234 for the gesture sensor 208 is on the dashboard 224 to the right of the steering wheel 226. A fourth position 236 is on the steering wheel 226. The skilled person will appreciate that the first position 230, second position 232, third position 234 and fourth position 236 are merely given as examples of locations and orientations of the gesture sensor 208. Any other suitable location and/or orientation may be used for the gesture sensor 208.

In use, a driver sits in the driver's seat 218. With the engine (not shown) running, and the transmission 202 in park mode, the driver depresses the foot brake 212. This causes generation of the foot brake status 214 indicating that the foot brake 212 has been depressed. The foot brake status 214 is output to the controller 204 either directly or via the vehicle management system 205, as discussed above.

The driver then makes a gesture with his/her hand close to the gesture sensor 208. For example, if the gesture sensor is in the first position 230, the gesture may be a sweeping gesture, starting with the hand behind the gesture sensor 208 and ending with the hand forward of the gesture sensor 208. If the gesture sensor 208 is in the fourth position 236 on the steering wheel 226, the gesture may similarly be a sweeping gesture, this time starting with the hand below the gesture sensor 208 and ending with the hand above the gesture sensor 208.

This gesture is identified by the gesture sensor 208 as being a selection gesture indicative of a forward drive mode. In response to identifying this gesture, the gesture sensor 208 generates a selection signal 206 indicative of the forward drive mode associated with the forward drive mode gesture and outputs it to the controller 204 either directly or via the vehicle management system 205, as discussed above.

The controller 204 is programmed and configured such that it only allows a forward drive mode selection gesture to cause the transmission 202 to enter the forward drive mode when the foot brake signal 214 indicates that the foot brake 212 is depressed. This may be a legal requirement in some jurisdictions, for example. In an example, the controller 204 will only cause the transmission 202 to enter a forward drive mode when the foot brake signal 214 indicates that the foot brake 212 is depressed and it is determined that the vehicle is being held stationary.

Once the transmission 202 is placed in the forward drive mode, the driver may release the foot brake 212 and accelerate away by depressing the accelerator (not shown).

Upon stopping, the forward drive mode may be disengaged by placing the transmission 202 into another drive mode, such as the park mode. This may be achieved by using another gesture, such as the driver swiping his/her hand side to side over the gesture sensor 208. Alternatively, the park mode may be entered by pressing a dedicated button (not shown), or automatically in response to the driver applying a parking brake or remaining stationary for some period of time.

Upon stopping (or initially), the driver may also place the transmission 202 into the reverse drive mode. This may be achieved by a similar sequence of steps as for placing the transmission 202 into the forward drive mode, including applying the brake and making a gesture above the gesture sensor 208. In this case, however, the gesture is the reverse of the forward drive mode gesture. For example, if the gesture sensor is in the first position 230, the gesture may be a sweeping gesture, starting with the hand forward of the gesture sensor 208 and ending with the hand behind the gesture sensor 208. If the gesture sensor 208 is in the fourth position 236 on the steering wheel 226, the gesture may similarly be a sweeping gesture, this time starting with the hand above the gesture sensor 208 and ending with the hand below the gesture sensor 208.

In this case, the gesture is identified by the gesture sensor 208 as being a selection gesture indicative of a reverse drive mode. In response to identifying this gesture, the gesture sensor 208 generates a selection signal 206 indicative of the reverse drive mode associated with the reverse drive mode gesture and outputs it to the controller 204 either directly or via the vehicle management system 205, as discussed above.

As with the forward drive mode, the controller 204 is programmed and configured such that it only allows a reverse drive mode selection gesture to cause the transmission 202 to enter the reverse drive mode when the foot brake signal 214 indicates that the foot brake 212 is being applied. This may be a legal requirement in some jurisdictions, for example.

Once the transmission 202 is placed in the reverse drive mode, the driver may release the foot brake 212 and accelerate away by operation of the accelerator (not shown).

Upon stopping, the reverse drive mode may be disengaged by placing the transmission 202 into another drive mode, such as the park mode as described above. The driver may also place the transmission 202 back into the forward drive mode as described above.

Figure 4:
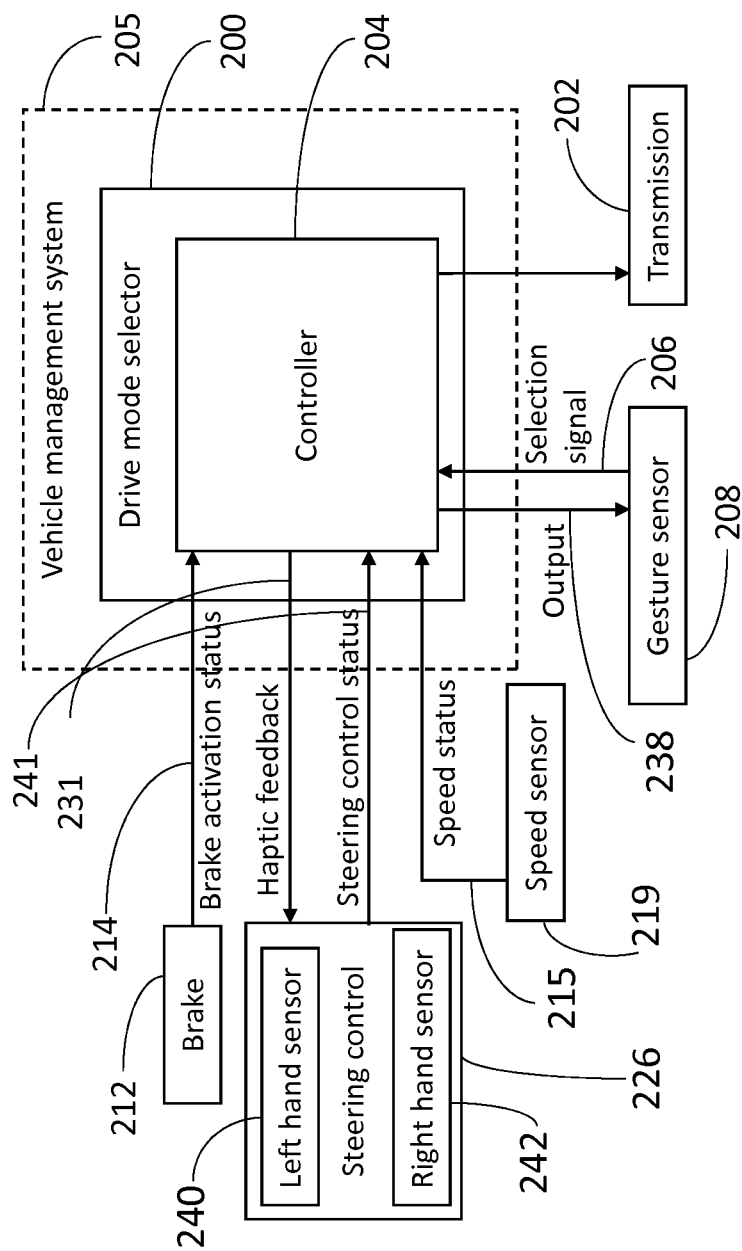
FIG. 4 is a schematic diagram showing components of an alternative vehicle, comprising an alternative embodiment of the drive mode selector according to an embodiment of the invention.

Turning to FIG. 4, there is shown an alternative embodiment, in which the controller 204 includes an output 238 for controlling the gesture sensor 208. The output 238 is an enable signal for the gesture sensor 208. The output 238 may selectively enable the gesture sensor 208 under the control of the controller 204 such that the gesture sensor 208 only identifies selection gestures when enabled to do so by the controller 204. When the output 238 is not enabling the gesture sensor 208, the gesture sensor 208 does not attempt to identify gestures by the driver. The output 238 may be a digital or analogue signal that the gesture sensor 208 uses to determine whether to attempt to identify gestures. Alternatively, the output may be a power supply for the gesture sensor 208, which, when switched on, powers up the gesture sensor 208 so that it may attempt to identify gestures.

In an alternative embodiment, the output 238 may only control whether the selection signal 206 is output to the controller 204. In such embodiments, the gesture sensor 208 continuously or intermittently identifies gestures, but only generates the selection signal 206 when enabled by the output 238. In this case, the output 238 may be a digital or analogue signal that the gesture sensor 208 uses to determine whether to attempt to identify gestures.

While the status signal of the embodiment described in FIG. 2 is the foot brake signal 214, it will be appreciated that the status signal may indicate a status of a different vehicle component that may be relevant to at least one of the drive modes. For example, the status signal may be a steering wheel status 241 (see FIG. 4) relating to one or more touch sensors on the steering wheel 226. The or each touch sensor may be a proximity sensor, a pressure sensor, heat sensor, capacitive sensor, or any other sensor capable of sensing the type of touch or grasping that is to be detected.

In the embodiment of FIG. 4, there are two touch sensors on steering wheel 226: a left hand touch sensor 240 and a right hand touch sensor 242. The touch sensors 240 and 242 include, or are connected to, control circuitry (not shown) that generates a status signal in the form of a steering wheel status indicative of whether either or both of the touch sensors 240 and 242 are being touched by the driver. The sensors 240 and 242 and any associated control circuitry may be configured to send the steering wheel status 241 to the controller 204.

As with the embodiment of FIG. 2, the controller 204 is configured such that it does not cause the transmission 202 to enter the drive mode indicated by the selection signal 206 when the steering wheel status 241 does not indicate that the steering wheel 226 is being grasped or touched by the driver. There are a number of ways in which this may be implemented. For example, in an embodiment with left and right touch sensors 240 and 242 as illustrated in FIG. 4, the controller 204 may be configured to cause the transmission 202 to enter the drive mode indicated by the selection signal when the steering wheel status 241 indicates that at least the touch sensor on the other side of the steering wheel 226 from the gesture sensor 208 is being touched or grasped when the driver makes the selection gesture. By requiring that the touching or grasping of the steering wheel 226 take place on the other side of the steering wheel 226 from where the gesture sensor is positioned, there is a lower chance of the drive mode being changed unintentionally. For example, if the gesture sensor 208 is in the first position 230, the touching or grasping of the steering wheel 226 may need to be at the top right of the steering wheel 226. If the gesture sensor 208 is in the fourth position 236, the touching or grasping of the steering wheel 226 may need to be at the bottom left of the steering wheel 226. This approach may be implemented with a single touch sensor, or with multiple touch sensors.

Where more than one touch sensor (or a single sensor that may detect substantially simultaneous touching or grasping at more than one place on the steering wheel 226) is used, the controller 204 may be configured to cause the transmission 202 to enter the drive mode indicated by the selection signal when the steering wheel status 241 indicates a particular sequence of steering wheel touches before, during or after the driver makes the selection gesture near the gesture sensor 208. For example, prior to the driver making the gesture, the steering wheel 226 may need to have been touched or grasped at two points, such as on opposite sides of the steering wheel. Subsequently, the steering wheel 226 may need to have been touched or grasped on the other side of the steering wheel 226 from the gesture sensor 208 at the time the driver made the selection gesture. In at least some embodiments, the selection gesture may need to be made within a predetermined period, for example, within 1 or 2 seconds following initiation or completion of the initial two-point touch or grasp. The specific predetermined period may be chosen to suit particular circumstances or legal requirements, and may be adjustable to suit user preferences.

Other forms of touch sensor may be used on the steering wheel 226. For example, some or all of the rim of the steering wheel may be covered in the touch sensors. Some or all of the rim of the steering wheel 226 may be covered in one or more sensors that that are capable of detecting multiple touches or grasps. One advantage of providing the ability to sense more than just touches and/or grasps on the left or right of the steering wheel 226 is that the touch sensor(s) (and any associated control circuitry) may determine touches and/or grasps independent of steering wheel position. For example, when the steering wheel 226 is turned 90 degrees clockwise, the left hand side of the steering wheel is at the top and the right hand side of the steering wheel is at the bottom. It may be difficult, or at least not intuitive, for the driver to place his/her left and right hands at the top and/or bottom positions prior to, or while, making the selection gesture. As such, the touch sensor(s), any associated control circuitry and/or the controller 204 may be configured to determine the position(s) at which the driver is touching or grasping the steering wheel 226, relative to the steering wheel 226 when it is in the rotational position for straight-ahead driving.

Figure 5A:
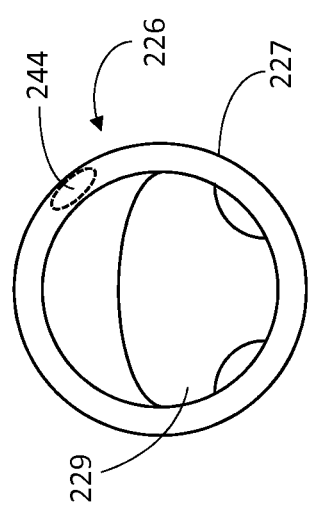
FIGS. 5A and 5B show a car steering control, in the form of a steering wheel, comprising a steering wheel touch sensor for use with a drive mode selector according to an embodiment of the invention.
Figure 5B:
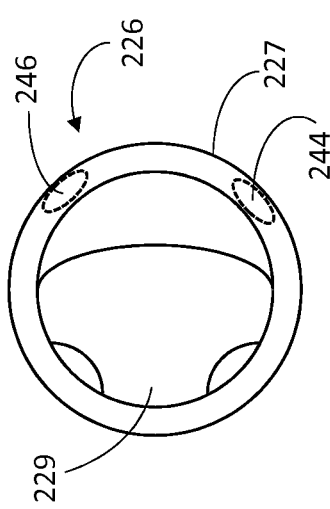

This principle is illustrated in FIGS. 5A and 5B. In FIG. 5A, the steering wheel 226 is in the rotational position for straight-ahead driving. The steering wheel 226 comprises a rim 227 and central portion 229. If a driver touches or grasps a region 244 of the rim 227, for example, this will be interpreted by the controller 204 as a touch to the upper right hand side of the steering wheel 226. If the steering wheel 226 is turned 90 degrees clockwise as shown in FIG. 5B, region 244 is now to the bottom right, relative to the driver (and relative to the original straight-ahead position of the steering wheel 226). Touching or grasping region 246 is interpreted by the controller as a touch to the upper right hand side of the steering wheel 226, despite the fact that the region 246 is positioned on the upper left side of the steering wheel 226 when it is in the straight-ahead position. Determining how to map a particular region to a relative position based on a rotational position of the steering wheel 226 may require information about the rotational position of the steering wheel 226. This may be provided based on input from a rotational position sensor (not shown) associated with the steering wheel 226 or other component of the vehicle steering system. The information may be provided to the controller 204 directly from the any such rotational position sensor, or from the vehicle management system 205.

As shown in FIG. 4, the steering wheel 226 may provide haptic feedback 231 to the driver. For example, a motor or vibration unit (not shown) may cause the steering wheel 226 to vibrate in a particular way to indicate whether a gesture has been identified. For example, a particular vibration pattern, such as a single long pulse, may indicate that a gesture has been identified. Alternatively, individual vibration patterns may be used to indicate different gestures that have been identified. For example, identification of a forward drive mode gesture may result in a single long pulse, while identification of a reverse drive mode gesture may result in a short pulse followed by a long pulse. Alternatively, or in addition to any of the patterns mentioned above, a particular pattern may be used to indicate that the gesture sensor 208 has noted an attempt at a gesture but has not been able to identify it, or has identified a gesture that it is not possible to implement in the current circumstances. For example, it may not be possible to place the transmission into a forward drive mode if the vehicle is presently reversing at above a certain threshold speed.

Similar haptic feedback may be provided through other elements of the car, such as the accelerator or brake controls, or seat cushion associated with a driver's seating position.

Other forms of feedback may be used in relation to this and the other described embodiments above and below. For example, tones, vocal feedback or other sounds may be used to indicate successful identification of a gesture. Visual confirmation may also be provided by way of displays, lights or projections onto, for example, a heads-up display, including by way of text, icons and/or animations. Where the gesture sensor 208 fails to identify a gesture, or the identified gesture cannot be implemented in the current circumstances, visible, audible, and/or haptic feedback may be provided to the driver, noting the problem and potentially suggesting a solution. For example, an attempt to place the transmission in the reverse drive mode while the car is moving forwards at 10 miles per hour may result in a recorded or synthesised voice telling the driver that the car must be travelling below 3 miles per hour for the reverse drive mode to be selectable.

In yet other embodiments, the status signal may relate to an indication of vehicle speed, or an indication that the vehicle's speed is above or below a threshold. The speed may be supplied by a speed sensor 219 (see FIG. 4), which may be of any suitable type including wheel speed sensors, one or more accelerometers, GPS units, a mechanical or electric speedometer connected to an engine or drivetrain, or any suitable combination thereof. The current speed, or indication of whether the current speed is above or below a threshold, may be provided directly from the speed sensor(s), or via the vehicle management system 205, in the form of a speed status 215 (see FIG. 4).

The controller 204 may be configured such that it does not cause the transmission to enter the drive mode indicated by the selection signal when the speed status indicates that the vehicle's speed is higher than a threshold. For example, it may only be allowable to change from a forward drive mode to a reverse drive mode if the current speed is less than, say, 3 kilometres per hour (km/h). This is to reduce the chance of damage to the drivetrain or engine as a result of the car's kinetic energy causing the drivetrain to rotate against the direction of the currently selected drive mode.

The skilled person will appreciate that the controller 204 may receive one or more status signals indicating a status of other types of vehicle components. For example, the status signals may be provided for any one or more of the following vehicle components, each of which may be relevant to at least one of the drive modes:

parking brake mode (e.g., don't allow selection of forward or reverse drive mode if parking brake is off);

feedback from radar, lidar and/or one or more other external proximity sensors (e.g., don't allow selection of forward or reverse drive mode if external proximity sensor indicates an obstacle);

seat belt sensors (e.g., don't allow selection of forward drive mode if driver's seatbelt not fastened); and Ride height and/or transfer box status, whose modes of operation may be switched between settings optimised for relatively low-speed off-road driving and relatively high-speed, on-highway driving (e.g., and where forward or reverse drive modes may be configured to operate in an off-road or an on-highway mode in dependence at least in part on the configuration of these vehicle components).

This list is not intended to be exhaustive.

The skilled person will appreciate that the controller 204 may use any combination of status signals as inputs when determining whether or not to change drive mode based on the drive mode indicated by the selection signal 206. Different combinations may be used depending on the particular selection signal received and/or the current drive mode that is selected.

The skilled person will appreciate that different embodiments may use different combinations of drive modes. For example, the drivetrain may have a forward mode and a reverse mode. The drivetrain may have a neutral mode, and/or a park mode, as described above. Further, the drivetrain may additionally have a dual ratio transfer box, arranged to provide the drivetrain with a high-ratio mode for more comfortable on-highway driving, and a low-ratio mode to enhance the vehicle's off-road driving capability.

The drivetrain may also have more than one forward drive mode, such as, for example, a number of forward gears. In this case, the controller 204 may optionally enable a driver to manually choose when to change gears. For example, the controller may be configured to receive an increment signal from the gesture sensor 208. The increment signal may be indicative of a drive mode increment gesture made by the driver. The drive mode increment gesture may be, for example, the same or similar to the gesture used to select a drive mode initially. For example, sweeping the hand rearwards over the gesture sensor 208 may be interpreted as an upshift, in the manner that a rearward pull on a conventional sequential transmission lever causes an upshift.

The controller may also be configured to receive a decrement signal from the gesture sensor 208. The decrement signal may be indicative of a drive mode decrement gesture made by the driver. The drive mode decrement gesture may be, for example, the same or similar to the gesture used to select a drive mode initially. For example, sweeping the hand forwards over the gesture sensor 208 may be interpreted as a downshift, in the manner that a forward push on a conventional sequential transmission lever causes a downshift.

The controller 204 may be configured to interpret these gestures in this way only in particular circumstances, such as when the car is above a threshold speed, or when a sequential shift mode is manually selected. Manual selection of this sequential shift mode may be via a separate set of controls (such as a button, not shown), or may involve the driver making a specific gesture over the gesture sensor 208. For example, the gesture sensor 208 may interpret a circular motion of the driver's hand above the gesture sensor 208 as selection of the sequential gear mode.

Alternatively, different gestures may be made to sequentially shift gears when the car is moving. For example, a left to right gesture may be interpreted as an upshift, and a right to left gesture may be interpreted as a downshift.

It will be appreciated that whichever gesture causes incrementing, decrementing or changing of a drive mode, the controller 204, the vehicle management system 205, and/or other controllers and components of the car are configured to ensure that the driver's selected drive mode will only be implemented if it is mechanically safe to do so. For example, a downshift gesture may not be acted upon, or at least may be delayed, if implementing the downshift immediately would cause the engine to over-rev.

Although the drive mode selector 200 has been described as being separate from the gesture sensor 208, the drive mode selector may include the gesture sensor 208, in the sense that they may be physically, electronically, or functionally integrated. This may involve, for example, sharing a power supply, and/or the controller 204 identifying the selection gesture and generating the selection signal 206 from it.

The status signal may take the form of an analogue or digital signal carried electrically, optically, sonically, or by any other suitable means. It may also take the form of an absence of a signal value. For example, a status signal may be transmitted by setting to ground the value of the voltage carried by a wire. The controller then interprets the absence of a positive voltage value (i.e., zero volts) as being the status signal. The choice of status signal may take into account failsafe design considerations.

FIGS. 6A to 6H show plan views of various examples of gesture sensors that may be employed in embodiments of the invention. It will be understood that the diagrams in FIGS. 6A to 6H are schematic, and may represent any one or more of:

a physical shape of the gesture sensor;
a shape of a detection area of the gesture sensor; and
a physical shape, physical arrangement and/or shape of a detection area corresponding to one or more sensors comprising the gesture sensor.

Figure 6C:
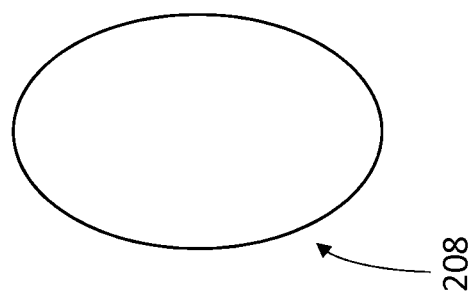
Figure 6B:
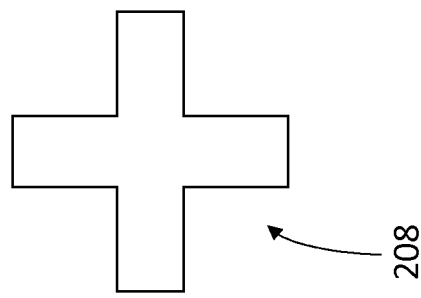
Figure 6A:
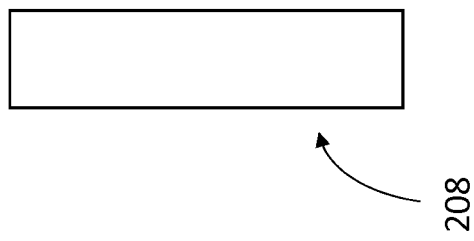

FIG. 6A shows a gesture sensor 208 having a linear form. In an embodiment, a longitudinal axis of the gesture sensor 208 is substantially parallel to a longitudinal axis of the vehicle within which the gesture sensor 208 is installed. The gesture sensor 208 in FIG. 6A may comprise a single proximity or other sensor capable of sensing one or more gestures made in one, two or three dimensions above the gesture sensor. Alternatively, the gesture sensor may comprise two or more proximity and/or other sensors that together enable sensing of such gestures.

FIG. 6B shows a generally cruciform gesture sensor 208. In an embodiment, the longitudinal (i.e., north-south) axis of the gesture sensor 208 is substantially parallel to a longitudinal axis of the vehicle within which the gesture sensor 208 is installed. The gesture sensor 208 in FIG. 6B may comprise a single proximity or other sensor capable of sensing one or more gestures made in one, two or three dimensions above the gesture sensor. Alternatively, the gesture sensor may comprise two or more proximity and/or other sensors that together enable sensing of such gestures.

FIG. 6C shows a generally oval gesture sensor 208. In an embodiment, the longitudinal (i.e., north-south) axis of the gesture sensor 208 is substantially parallel to a longitudinal axis of the vehicle within which the gesture sensor 208 is installed. The gesture sensor 208 in FIG. 6B may comprise a single proximity or other sensor capable of sensing one or more gestures made in one, two or three dimensions above the gesture sensor 208. Alternatively, the gesture sensor may comprise two or more proximity and/or other sensors that together enable sensing of such gestures.

Figure 6D:
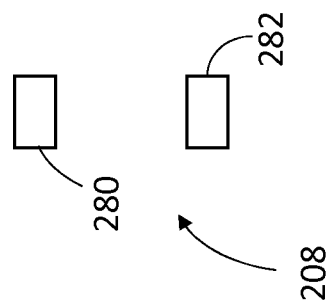

FIG. 6D shows a gesture sensor 208 comprising a first sensor 280 and a second sensor 282. In an embodiment, the first sensor 280 and second sensor 282 are laid out on a longitudinal (i.e., north-south) axis substantially parallel to a longitudinal axis of the vehicle within which the gesture sensor 208 is installed. Each of the first sensor 280 and the second sensor 282 in FIG. 6D may comprise one or more proximity and/or other sensors. The first sensor 280 and second sensor 282 together are capable of sensing one or more gestures made in one, two or three dimensions above the gesture sensor 208.

Figure 6E:
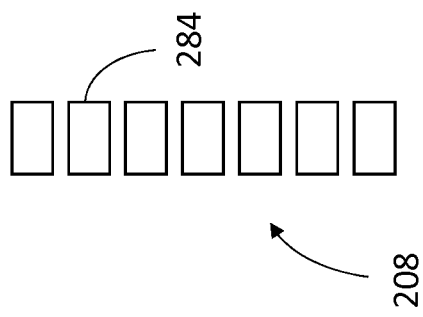

FIG. 6E shows a gesture sensor 208 comprising a linear array of several sensors 284. In an embodiment, the several sensors 284 are laid out on a longitudinal (i.e., north-south) axis substantially parallel to a longitudinal axis of the vehicle within which the gesture sensor 208 is installed. Each of the several sensors 284 may comprise one or more proximity and/or other sensors. The several sensors 284 together are capable of sensing one or more gestures made in one, two or three dimensions above the gesture sensor 208.

FIG. 6F shows a gesture sensor 208 comprising an array of four sensors 286 laid out in a diamond shape having a longitudinal (i.e., north-south) axis substantially parallel to a longitudinal axis of the vehicle within which the gesture sensor 208 is installed. Each of the four sensors 286 may comprise one or more proximity and/or other sensors. The four sensors 286 together are capable of sensing one or more gestures made in one, two or three dimensions above the gesture sensor 208.

FIG. 6G shows a gesture sensor 208 comprising an array of four sensors 286 laid out in a square shape having a longitudinal (i.e., north-south) axis substantially parallel to a longitudinal axis of the vehicle within which the gesture sensor 208 is installed. Each of the four sensors 286 may comprise one or more proximity and/or other sensors. The four sensors 286 together are capable of sensing one or more gestures made in one, two or three dimensions above the gesture sensor 208.

FIG. 6H shows a gesture sensor 208 comprising an array of three sensors 288 laid out in a triangle having a longitudinal (i.e., north-south) axis substantially parallel to a longitudinal axis of the vehicle within which the gesture sensor 208 is installed. Each of the three sensors 288 may comprise one or more proximity and/or other sensors. The three sensors 286 together are capable of sensing one or more gestures made in one, two or three dimensions above the gesture sensor 208.

Although particular orientations, shapes, aspect ratios, sensor numbers and sensor types have been described in relation to FIGS. 6A to 6H, the skilled person will appreciate that a gesture sensor 208 may comprise any combination of these factors, values of which can be selected or adjusted based on the desired outcome for a particular embodiment. Also, orientations, shapes, aspect ratios, sensor numbers and sensor types other than those shown in FIGS. 6A to 6H may be employed. For example, the gesture sensor 208, or any individual sensors comprising the gesture sensor 208, may be physically shaped, sized, or orientated (or have a detection area that is shaped, sized or orientated) differently to any of the examples shown in FIGS. 6A to 6H.

Figure 7:
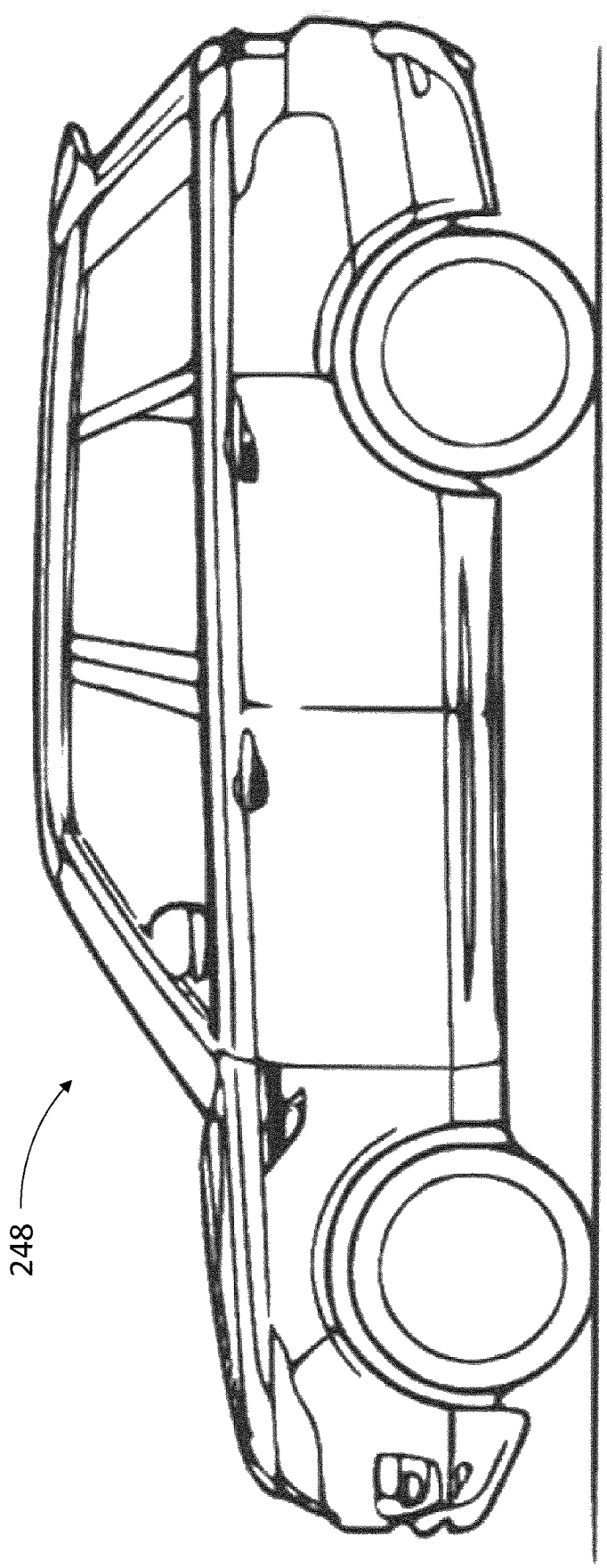
FIG. 7 is a side elevation of a vehicle in the form of a car comprising a drive mode selector, according to an embodiment of the invention.

Turning to FIG. 7, there is shown a vehicle comprising a car 248. The car 248 comprises a drive mode selector, such as any drive mode selector described above.

Figure 8:
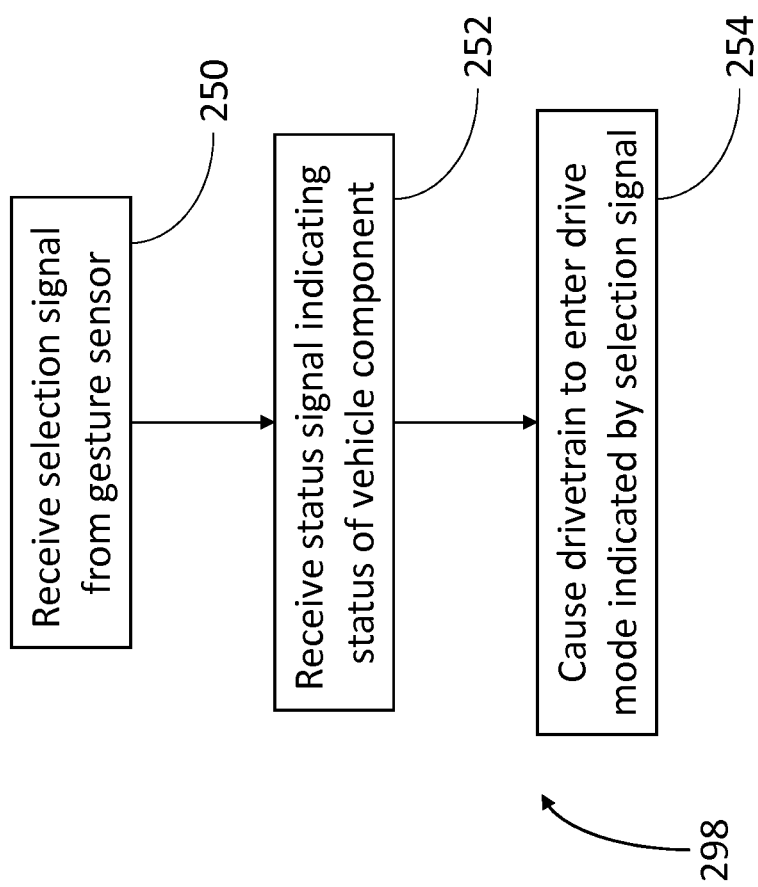
FIG. 8 is a flowchart showing a method of selecting a drive mode, according to an embodiment of the invention.

Referring to FIG. 8, there is shown a flowchart 298 illustrating method of selecting a drive mode of a drivetrain of a vehicle, such as the car of FIG. 7. The method comprises the steps of:

receiving 250 a selection signal from a gesture sensor, the selection signal being indicative of a drive mode associated with an identified selection gesture made by a driver;

receiving 252 a status signal indicating a status of at least one vehicle component, the status of the or each vehicle component being relevant to at least one of the drive modes; and causing 254 the drivetrain to enter the drive mode indicated by the selection signal when the status signal indicates that the drive mode can be selected.

Figure 9:
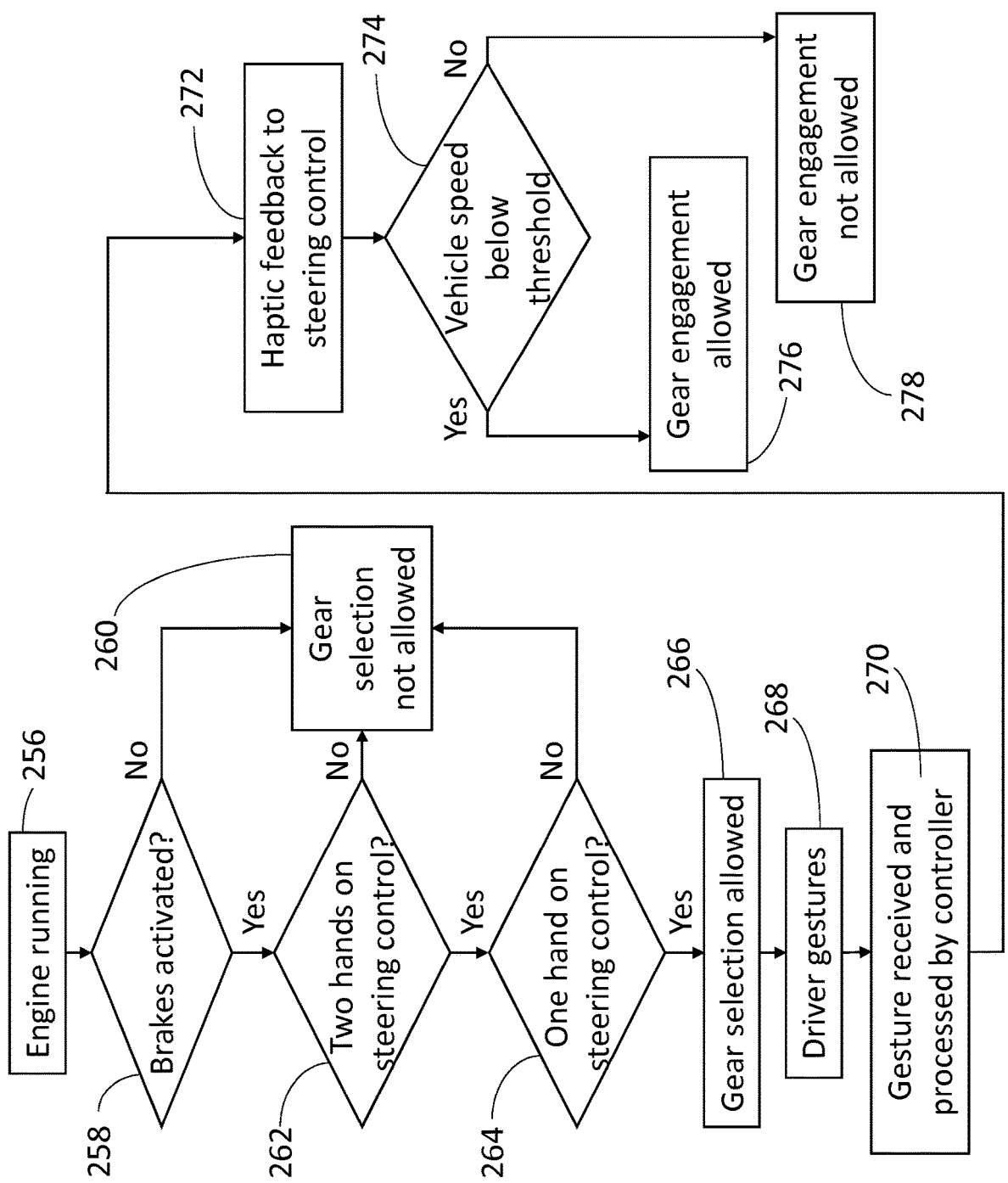
FIG. 9 is a flowchart showing an alternative embodiment of the method of selecting a drive mode, according to an embodiment of the invention.

Turning to FIG. 9, there is shown an alternative embodiment of a method of selecting a drive mode of a drivetrain of a vehicle, such as the car of FIG. 7. With the engine running 256, a decision 258 is made as to whether the driver's foot is on the foot brake. This may be determined as described above in relation to other embodiments. If the driver's foot is not on the foot brake, gear selection is not allowed 260 and the process is stalled until it is determined that the driver's foot is on the foot brake. The driver's foot may be need to be detected as being on the foot brake for a minimum period of time, for example to help avoid identification of an accidental or unintended touch of the brake pedal as a positive decision by the driver to perform a part of the sequence required to allow a drive mode to be selected.

When it is determined that the driver's foot is on the foot brake, a decision 262 is made as to whether the driver has two hands on the steering wheel. This may be determined as described above in relation to other embodiments. If the driver does not have two hands on the steering wheel, gear selection is not allowed 260 and the process is stalled until it is determined that the driver has two hands on the steering wheel. The driver's hands may be need to be detected as being on the steering wheel for a minimum period of time, for example to help avoid identification of an accidental or unintended touch of the steering wheel as a positive decision by the driver to perform a part of the sequence required to allow a drive mode to be selected.

When it is determined that the driver has two hands on the steering wheel, a decision 264 is made as to whether the driver subsequently has only one hand on the steering wheel. This may be determined as described above in relation to other embodiments. As described in other embodiments, this may be a safety feature to help avoid identification of an accidental or unintended gesture as being a drive mode selection gesture. The driver's hand may need to be detected as being on the steering wheel for a minimum period of time, for example to help avoid identification of an accidental or unintended touch of the steering wheel as a positive decision by the driver to perform a part of the sequence required to allow a drive mode to be selected.

The sequence of actions performed in relation to decisions 258, 262 and 264, or a subset thereof, may need to be performed within a period of time, for example to help avoid identification of an accidental or unintended sequence of actions as a positive decision by the driver to perform the sequence, or part of the sequence, required to allow a drive mode to be selected.

Once the decisions 258, 262 and 264 have all been answered affirmatively (within a particular period of time, if required), drive mode selection in the form of gear selection is allowed 266.

The driver may then perform a gesture 268 to be sensed by the gesture sensor, as described in relation to other embodiments. If the transmission is an automatic transmission, a forward/upward gesture may be interpreted as being indicative of a forward drive mode selection. A rearward/downward gesture may be interpreted as being indicative of a reverse drive mode selection. The gesture may need to be made or received within a period of time, for example to help avoid identification of an accidental or unintended gesture as a drive mode selection gesture. The period may be measured from, for example, the time at which the driver's second hand is determined as having been removed from the steering wheel.

The identified drive mode selection gesture is then forwarded to the controller, which may be, for example, within a gear shift module (GSM) that controls the transmission, as described in other embodiments.

The identified drive mode selection gesture is received and processed 270 by the controller, as described in other embodiments.

The controller provides haptic feedback 272 via the steering wheel, as described in other embodiments.

A decision 274 is then made as to whether the speed is below a threshold, such as 3 kilometres per hour (km/h). If the speed is below the threshold, gear engagement is allowed 276, in which case the controller causes the transmission to enter the selected drive mode. If the speed is above the threshold, gear engagement is not allowed 278, in which case the controller may wait until the speed drops below the threshold before causing the transmission to enter the selected drive mode. The controller may only wait for the speed to drop below the threshold for some time period, such as 2-3 seconds, to ensure, for example, that the driver is not surprised by the gear changing a relatively long time after the attempt to change gear was made. Other threshold speeds and threshold time periods are useful.

In some embodiments, information about vehicle speed and/or whether the driver's foot is on the foot brake may be provided to the controller by an anti-lock braking system (ABS) module.

In some embodiments, information about whether the steering wheel is held with one and/or both hands may be provided to the controller by a body control module.

In some embodiments, the controller may not directly cause a change of drive mode, but may send information to a transmission control module or vehicle supervisory control (VSC) module.

In some embodiments, haptic feedback may be provided by a body control module responsive to a signal from the controller.

The embodiments above have described controlling a drive mode of an automatic transmission mated to an internal combustion engine. Although a diesel engine has been described, the skilled person will appreciate that any form of engine may be used. Also, while an automatic transmission with discrete gear ratios has been described, in other embodiments, a constantly variable transmission may be employed. In yet other embodiments, a semi-automatic transmission may be employed.

The drivetrain may also include one or more electric motors. In some such embodiments, the electric motors form part of a hybrid system in which some power is provided by an internal combustion engine, and the rest is provided by the one or more electric motors. In such embodiments, the electric motor(s) are controlled such that they supplement the power from the internal combustion engine. As such, a drive mode of the electric motors must, in general, match that of the internal combustion engine and its drivetrain.

In other embodiments (or when a hybrid vehicle is running in solely electric mode), all drive is provided by one or more electric motors. In that case, the drive mode of the drivetrain comprises at least a forward and backward drive mode of the electric motor(s).

Although the above-described embodiments are cars, the invention may be applied in any motorised road-going or off-road vehicle, including, for example, a truck, a bus or a motorcycle.

Although the invention has been described with reference to a number of specific non-exhaustive and non-limiting embodiments, the skilled person will appreciate that the invention may be embodied in many other forms.

The invention claimed is:

1. A drive mode selector for a drivetrain of a vehicle, the drive mode selector comprising:
   a controller configured to receive:
      a selection signal from a gesture sensor, the gesture sensor comprising a proximity sensor, and the selection signal being indicative of a drivetrain drive mode associated with an identified selection gesture made by a user; and
      a status signal indicating a status of at least one vehicle component;
   the controller being further configured to cause the drivetrain to enter the drive mode indicated by the selection signal when the status signal indicates that the drive mode can be selected, wherein the status signal comprises an indication that a steering control of the vehicle is being grasped or touched by a user, wherein the controller is configured such that it can only cause the drivetrain to enter the drive mode indicated by the selection signal when the status signal indicates that the steering control is being grasped or touched by the user.

2. The drive mode selector of claim 1, wherein the controller includes an output configured to control the gesture sensor, such that the gesture sensor only identifies the selection gesture when enabled to do so by the controller.

3. The drive mode selector of claim 1, wherein the controller includes an output configured to control the gesture sensor, such that the gesture sensor only outputs the selection signal when enabled to do so by the controller.

4. The drive mode selector of claim 1, wherein the status signal comprises an indication of whether a brake is engaged, wherein the controller is configured such that it can only cause the drivetrain to enter the drive mode indicated by the selection signal when the status signal indicates that the brake is engaged.

5. A vehicle comprising the drive mode selector of claim 4.

6. A vehicle according to claim 5, wherein the brake is configured to be controlled by the driver by way of a foot pedal or hand lever.

7. The drive mode selector according to claim 1, wherein the status signal comprises an indication that the steering control is being grasped or touched on a side of the steering control opposite from where the gesture sensor is installed in the vehicle.

8. The drive mode selector of claim 1, wherein the status signal comprises an indication that the steering control is being grasped or touched on two positions of the steering control prior to the gesture being made by the user.

9. The drive mode selector according to claim 1, wherein the status signal comprises an indication of vehicle speed, or an indication that the vehicle's speed is above or below a threshold, wherein the controller is configured such that it can only cause the drivetrain to enter the drive mode indicated by the selection signal when the status signal indicates that the vehicle's speed is lower than the threshold.

10. The drive mode selector according to claim 1, wherein the drivetrain comprises an automatic or semi-automatic transmission, the at least one forward drive mode and at least one reverse drive mode being modes of the transmission.

11. The drive mode selector according to claim 1, wherein the drivetrain has a plurality of forward drive modes, the controller being further configured to:
    receive an increment signal from the gesture sensor, the increment signal being indicative of a drive mode increment gesture made by the user, and in response thereto, to cause the drivetrain to enter a higher forward drive mode than the current forward drive mode.

12. The drive mode selector according to claim 1, comprising the gesture sensor, the gesture sensor being configured to:
    identify the selection gesture made by a user; and
    output the selection signal associated with the identified selection gesture.

13. The drive mode selector according to claim 12, wherein the gesture sensor comprises one or more proximity sensors.

14. A vehicle comprising the drive mode selector of claim 1.

15. The drive mode selector according to claim 1, wherein the drivetrain has a plurality of forward drive modes, the controller being further configured to:
    receive a decrement signal from the gesture sensor, the decrement signal being indicative of a drive mode decrement gesture made by the user, and in response thereto, to cause the drivetrain to enter a lower forward drive mode than the current forward drive mode.

16. A vehicle comprising the drive mode selector of claim 1.

17. A vehicle according to claim 16, wherein the steering control comprises a steering wheel or handlebars.

18. A method of selecting a drive mode of a drivetrain of a vehicle, the method comprising:
    receiving a selection signal from a gesture sensor, the gesture sensor comprising a proximity sensor, and the selection signal being indicative of a drive mode associated with an identified selection gesture made by a user;
    receiving a status signal indicating a status of at least one vehicle component;
    causing the drivetrain to enter the drive mode indicated by the selection signal when the status signal indicates that the drive mode can be selected, wherein the status signal comprises an indication that a steering control of the vehicle is being grasped or touched by a user; and
    only causing the drivetrain to enter the drive mode indicated by the selection signal when the status signal indicates that the steering control is being grasped or touched by the user.

* * * * *